(12) United States Patent
Bluvstein et al.

(10) Patent No.: US 6,451,074 B2
(45) Date of Patent: Sep. 17, 2002

(54) METHOD FOR MAKING CONDUCTIVE POLYMER CAPACITOR

(75) Inventors: Alexander Bluvstein, Dimona; Gerovich Vera, Beer-Sheva; Alexander Osherov, Beez Sheva; Vitaly Strokhin, Beer Sheva, all of (IL)

(73) Assignee: Vishay Intertechnology, Inc., Malvern, PA (US)

(*) Notice: Subject to any disclaimer, the term of this patent is extended or adjusted under 35 U.S.C. 154(b) by 0 days.

(21) Appl. No.: 09/824,287

(22) Filed: Apr. 2, 2001

Related U.S. Application Data

(62) Division of application No. 09/386,237, filed on Aug. 31, 1999.

(51) Int. Cl.⁷ .............................. H01G 9/00; H01G 9/02
(52) U.S. Cl. ..................... 29/25.03; 361/523; 361/525
(58) Field of Search .......................... 29/25.01–25.03; 361/523–525, 528

(56) References Cited

U.S. PATENT DOCUMENTS

| | | | |
|---|---|---|---|
| 4,780,796 A | 10/1988 | Fukuda et al. | 361/525 |
| 5,403,913 A | 4/1995 | MacDiarmid et al. | |
| 5,457,862 A | 10/1995 | Sakata et al. | 29/25.03 |
| 5,461,537 A | 10/1995 | Kobayashi et al. | 361/525 |
| 5,529,707 A | 6/1996 | Kejha | 252/62.2 |
| 5,665,490 A | 9/1997 | Takeuchi et al. | 429/192 |
| 5,746,934 A | 5/1998 | Sasaki et al. | |
| 5,886,108 A | 3/1999 | Miyamoto et al. | |
| 5,888,582 A * | 3/1999 | Kinard et al. | 427/79 |
| 5,895,606 A * | 4/1999 | Kudoh et al. | 252/500 |
| 5,978,203 A | 11/1999 | Kiyomura et al. | |
| 5,980,785 A | 11/1999 | Xi et al. | |

FOREIGN PATENT DOCUMENTS

| | | |
|---|---|---|
| EP | 0 697 705 A1 | 8/1995 |
| EP | 0 930 621 A1 | 7/1999 |
| JP | 406313108 A | 11/1994 |

* cited by examiner

Primary Examiner—Ha Tran Nguyen
(74) Attorney, Agent, or Firm—McKee, Voorhees & Sease, P.L.C.

(57) ABSTRACT

A conductive polymer capacitor includes an anode formed from a porous metal body having an anode lead extending therefrom. A dielectric layer is formed by oxidizing a surface of the anode. A solid electrolyte is formed on the dielectric layer and includes first and second polymer layers. The second conductive polymer layer includes a polyaniline layer formed by dipping the metal body having the first conductive layer thereon into a solution of doped polyaniline dissolved in an organic solvent.

7 Claims, 1 Drawing Sheet

METHOD FOR MAKING CONDUCTIVE POLYMER CAPACITOR

CROSS-REFERENCE TO A RELATED APPLICATION

This application is a division of application Ser. No. 09/386,237, filed Aug. 31, 1999 pending.

BACKGROUND OF THE INVENTION

The present invention relates to a conductive polymer capacitor and method for making same. Prior solid electrolytic capacitors have been provided from a molded porous body of metal such as tantalum, niobium, or aluminum which serves as an anode for the capacitor. The metal is powdered and is formed by heat and pressure into a solid porous body. An oxide coating is formed over the metal and a solid electrolyte such as maganese dioxide ($MnO_2$) is formed over the dielectric and serves as the cathode of the capacitor.

In recent years polymers have been used in forming the cathode solid electrolyte. Examples of the use of polymers as a solid cathode electrolyte are shown in U.S. Pat. Nos. 5,461,537; 4,780,796; and 5,457,862.

In these prior capacitors, two polymer layers are formed. The first polymer is formed by using a chemical oxidant to chemically oxidize and polymerize the polymer on the dielectric layer of the capacitor. Then a second polymer layer is formed using a solution containing an undoped polymer compound polymerized in advance and soluble in an organic solvent. After the formation of the second polymer compound, the second polymer compound is doped to make the undoped polymer compound layer conductive.

Therefore, a primary object of the present invention is the provision of an improved conductive polymer capacitor and method for making same.

A further object of the present invention is the provision of an improved conductive polymer capacitor which achieves very high conductivity of the polymer layers, thereby resulting in a capacitor with lower equivalent series resistance (ESR).

A further object of the present invention is the provision of an improved conductive polymer capacitor and method for making same which is more durable in use, more reliable in operation, and more efficient to manufacture.

SUMMARY OF THE INVENTION

The foregoing objects may be achieved by a conductive polymer capacitor having an anode formed from a porous metal body, and including an anode lead extending therefrom. A dielectric layer is formed on the surface of the anode by oxidizing the metal of the anode. A solid electrolyte is formed on the dielectric layer comprised of a first conductive polymer layer formed on the dielectric layer and a second conductive polymer layer formed on the first conductive polymer layer. The first conductive polymer layer is preferably a polypyrrole layer. The second conductive polymer layer comprises a polyaniline layer formed by dipping the metal body having the first conductive polymer layer thereon into a solution of doped polyaniline dissolved in an organic solvent.

As used herein the term "doped" refers to the use of a dopant which is either an electron donor or acceptor in polymer compounds such as polypyrrole, polythiophene, and polyaniline. Numerous types of dopants are well known in the art of making capacitors, and include, but are not limited to, naphtalenesulfonic acid sodium salt, toluenesulfonic acid sodium salt, and benzenesulfonic acid sodium salt. Other dopants capable of donating or accepting electrons to the polymer compound may be used without detracting from the invention.

Numerous organic solvents may be used for the dissolving of the polyaniline before the dipping process. Examples include but are not limited to m-Cresol, p-Cresol, o-Cresol, and Cl-Cresol.

In one form of the invention inorganic fillers may be included within the polyaniline solution inorganic solvent so that the second conductive layer, once formed by dipping, includes the inorganic filler within the second conductive layer. The inorganic filler may be selected from any of a number of inorganic fillers, including but not limited to graphite, $SiO_2$, $Al_2O_3$, $SrO_2$, $ZrO_2$, MgO, BeO.

DETAILED DESCRIPTION OF THE PREFERRED EMBODIMENT

Figure 1:
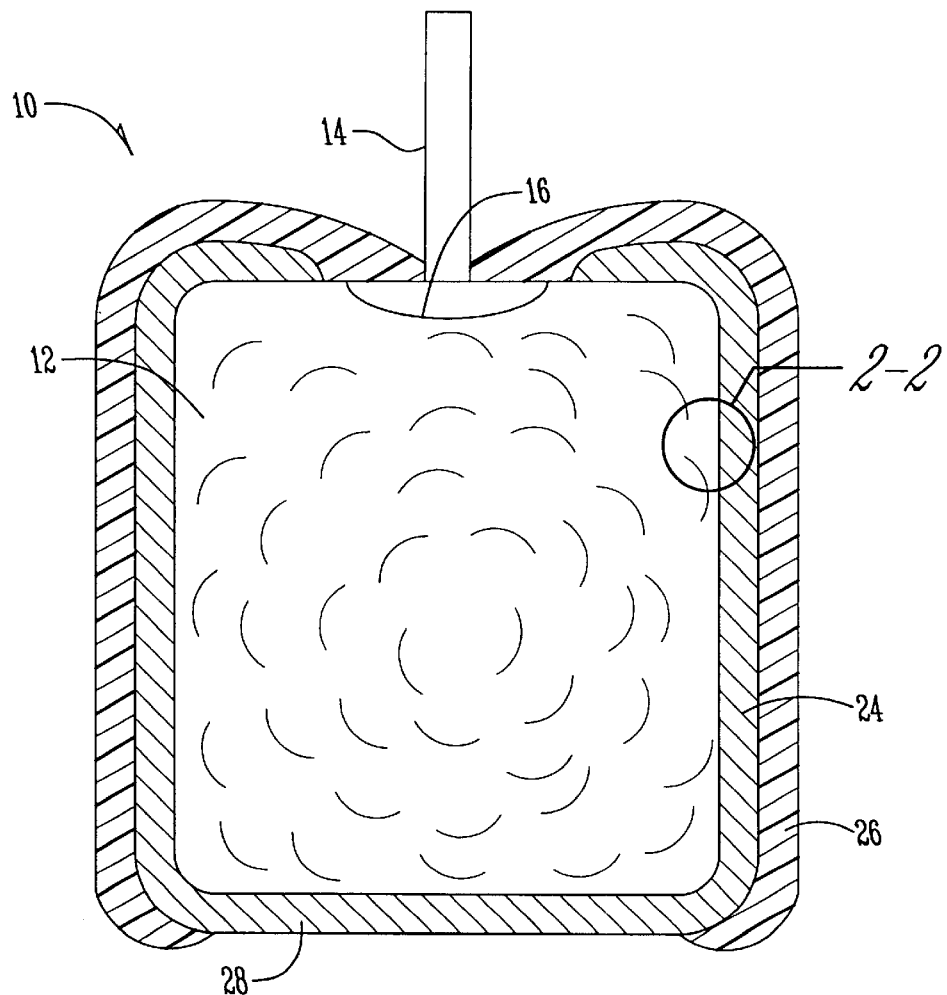
FIG. 1 is a sectional view of the capacitor of the present invention.
Figure 2:
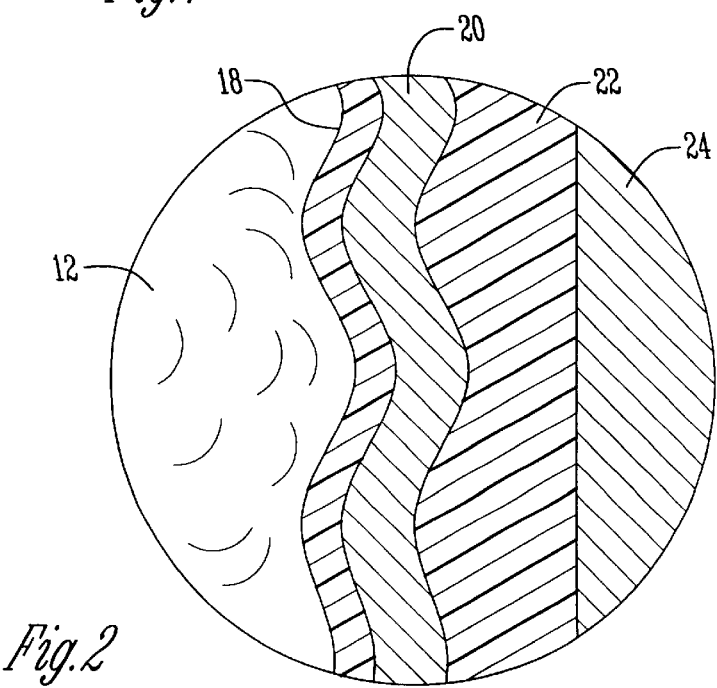
FIG. 2 is an enlarged sectional view taken along line 2—2 of FIG. 1.

Referring to the drawings the numeral 10 generally designates the capacitor of the present invention. Capacitor 10 includes an anode pellet 12 having an anode lead 14 connected thereto by means of a weld 16. The anode pellet is formed from a powdered metal such as tantalum, niobium, or aluminum. The method for forming the pellet 12 is well known in the art and involves compressing the powdered material into the pellet shape and sintering the pellet to cause it to retain its shape. The pellet 12 includes a plurality of voids interspersed throughout the pellet 12. Coating the surface of the pellet 12 is an oxide coating 18. While this oxide coating 18 is shown schematically in FIG. 2, the oxide coating coats the exposed surfaces of the particles within pellet 12 throughout the entire body 12.

A first polymer layer 20 is formed on the outer surface of the oxide coating 18, and a second polymer layer 22 is formed on the outside of the first polymer layer 20. A conductive cathode material 24 is formed on the outside surface of the polyaniline layer, and a dielectric coating 26 is formed around the outside of the entire capacitor 10, leaving a portion of the cathode 24 exposed to provide a cathode connecting surface 28 at the bottom of the capacitor.

The first step in the formation of cathode 10 is the formation of the metal body 12. This metal body may comprise tantalum, niobium, or aluminum powder which is compressed under pressure and then is sintered to form the anode pellet 12. The pellet 12 is then oxidized in accordance with the processes well known in the art to form the dielectric layer 18 on the surface of the pellet. The dielectric layer 18 is preferably an oxide of the metal powder used for the pellet 12.

After the formation of the oxide layer 18, two polymer layers 20, 22 are formed on the surface of the pellet 12. The formation of the two layers 20, 22 will be described below in detail by way of examples.

EXAMPLE 1

The first polymer layer 20 is formed by dipping the pellet 12 having the oxide coating 18 thereon into an iron (III)

chloride aqueous solution (2–20 wt. %) for 3–15 minutes at room temperature. It is then permitted to dry for 10–20 minutes at 60°–80° C. The pellet is then dipped into a solution of pyrrole (2–5 wt. %) and naphtalenesulfonic acid sodium salt (1–2 wt. %) for 5 minutes at 0°–10° C.

The dipped pellet is then permitted to dry for 10–20 minutes at 60°–80° C.

After drying the pellet is washed with methanol at room temperature for 5 minutes and is permitted to dry for 10–20 minutes at 60°–80° C. After completion of this drying step a polypyrrole layer is formed for the first polymer layer 20. This polymerization procedure is repeated 5–7 times.

The second polymer layer 22 is formed by dipping the pellet into a solution of doped polyaniline (2 wt. %) in m-Cresol for 5 minutes at room temperature. The dopant is camphorsulfonic acid.

It is then vacuum dried for 30–60 minutes at 60°–90° C. This step is repeated 2–3 times. This results in the formation of the second polymer layer 22 from as a polyaniline.

EXAMPLE 2

The formation of the pellet 12 having the oxide layer 18 thereon is the same as described above.

Also, the formation of the first polymer layer 20 of a polypyrrole material is the same as described above.

After the formation of the polypyrrole layer the pellet is dipped into a solution of doped polyaniline (2 wt. %) in m-Cresol with inorganic fillers such as $SiO_2$ or similar fillers for 5 minutes at room temperature. The pellet is then vacuum dried for 30–60 minutes at 60°–90° C.

EXAMPLE 3

The pellet 12, oxide layer 18, and first polymer layer 20 are formed in the manner described above in Examples 1 and 2. The pellet, having the polypyrrole polymer layer formed on the outer surface thereof is dipped into a solution of doped polyaniline (2 wt. %) in m-Cresol with graphite filler for 5 minutes at room temperature, and the pellet is vacuum dried for 30–60 minutes at 60°–90° C.

The use of fillers as described above for Examples 2 and 3 permits the fillers to be dispersed throughout the polyaniline layer 22, whereas prior art methods formed the fillers as separate layers rather than embedding them within the polyaniline layer.

The oxidant used for forming the polypyrrole layer in the above examples is preferably iron (III) chloride. However, also ferric salts of arylsulfonic acids may be used as oxidant.

The preferred dopant for use in the formation of the polyaniline layer in the above examples is camphorsulfonic acid. However, other acids may be used, including but not limited to, arylsulfonic acids.

The solvent for forming the polyaniline layer is preferably m-Cresol, but other solvents may be used such as p-Cresol, o-Cresol or Cl-Cresol.

The inorganic fillers described for Example 2 above preferably include $SiO_2$. However, other fillers such as $Al_2O_3$, $SnO_2$, $ZrO_2$, MgO, and BeO may be used.

In Examples 1–3 above, the process for forming the polypyrrole impregnation is repeated 5–10 cycles so as to form layer 20 of multiple polypyrrole layers. The formation of the polyaniline layer 22 is preferably two cycles so as to form two polyaniline based layers.

The above described method achieves a very high conductivity of the multiple polyaniline based layers. This results in capacitors with very low equivalent series resistance (ESR). Of particular importance is the ability to disperse inorganic fillers in the polyaniline layers so as to improve the electrical conductivity of the polyaniline layers.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for forming a conductive polymer capacitor comprising:

forming an anode from a porous metal body;

connecting an anode lead to said porous metal body;

oxidizing a surface of said anode to form a dielectric layer thereon;

forming a first conductive polymer layer on said dielectric layer;

forming a second conductive polymer layer on said first conductive polymer layer by dipping said metal body having said dielectric layer and said first conductive layer thereon into a solution of doped polyaniline dissolved in an organic solvent.

2. A method according to claim 1 and further comprising forming said doped polyaniline by using a dopant selected from the group consisting essentially of arylsulfonic acid and camphorsulfonic acid.

3. A method according to claim 1 and further comprising dissolving said doped polyaniline in said organic solvent wherein said organic solvent is selected from the group consisting essentially of m-Cresol, P-Cresol, o-Cresol, and Cl-Cresol.

4. A method according to claim 1 and further comprising forming said first conductive polymer layer from polypyrrole.

5. A method according to claim 1 and further comprising placing an inorganic filler within said organic solvent before said dipping step whereby said inorganic filler is within said second conductive polymer layer after said dipping step.

6. A method according to claim 5 wherein said inorganic filler is selected from the group consisting essentially of $SiO_2$, $Al_2O_3$, $SnO_2$, $ZrO_2$, MgO, and BeO.

7. A method according to claim 5 wherein said inorganic filler comprises graphite.

* * * * *